(12) United States Patent
Diggins et al.

(10) Patent No.: US 8,238,691 B2
(45) Date of Patent: Aug. 7, 2012

(54) METHOD OF AND APPARATUS FOR IMAGE ANALYSIS

(75) Inventors: Jonathan Diggins, Eastleigh (GB); Martin Weston, Petersfield (GB)

(73) Assignee: Snell & Wilcox Limited, Hampshire (GB)

( * ) Notice: Subject to any disclaimer, the term of this patent is extended or adjusted under 35 U.S.C. 154(b) by 1197 days.

(21) Appl. No.: 11/470,341

(22) Filed: Sep. 6, 2006

(65) Prior Publication Data

US 2007/0081741 A1  Apr. 12, 2007

(30) Foreign Application Priority Data

Sep. 9, 2005  (GB) .................................. 0518441.1

(51) Int. Cl.
*G06K 9/64* (2006.01)
(52) U.S. Cl. ........ 382/278; 382/294; 382/295; 704/216; 704/217; 704/218
(58) Field of Classification Search .................. 382/278, 382/294, 295; 704/216–218
See application file for complete search history.

(56) References Cited

U.S. PATENT DOCUMENTS

| | | | | |
|---|---|---|---|---|
| 4,396,903 A | * | 8/1983 | Habicht et al. ................. | 382/103 |
| 4,667,233 A | * | 5/1987 | Furukawa .................. | 375/240.12 |
| 4,864,629 A | * | 9/1989 | Deering .......................... | 382/216 |
| 4,925,274 A | * | 5/1990 | James et al. ................... | 359/561 |
| 4,998,286 A | * | 3/1991 | Tsujiuchi et al. ............. | 382/165 |
| 5,359,670 A | * | 10/1994 | Hunt .............................. | 382/153 |
| 5,619,596 A | * | 4/1997 | Iwaki et al. .................... | 382/278 |
| 5,917,960 A | * | 6/1999 | Sugawa ......................... | 382/278 |
| 5,970,180 A | * | 10/1999 | Niihara et al. ................. | 382/261 |
| 6,115,505 A | * | 9/2000 | Hashima et al. ............... | 382/286 |
| 6,157,744 A | * | 12/2000 | Nagasaka et al. ............. | 382/236 |
| 6,370,480 B1 | | 4/2002 | Gupta et al. .................... | 702/39 |
| 6,442,301 B1 | * | 8/2002 | Edgar ............................. | 382/275 |
| 6,584,224 B2 | * | 6/2003 | Kim et al. ...................... | 382/217 |
| 6,961,449 B2 | * | 11/2005 | Mil'shtein et al. ............ | 382/115 |
| 6,990,254 B2 | * | 1/2006 | Nahum ........................... | 382/278 |
| 6,996,291 B2 | * | 2/2006 | Nahum ........................... | 382/278 |
| 7,283,677 B2 | * | 10/2007 | Gao et al. ....................... | 382/250 |
| 7,454,078 B2 | * | 11/2008 | Ramamurthy ................. | 382/254 |

(Continued)

FOREIGN PATENT DOCUMENTS

EP    1 519 314 A1    3/2005

(Continued)

OTHER PUBLICATIONS

Baccichet et al., "Frame concealment for H.264/AVC Decoders", 2005 Digest of Technical Papers, International Conference on Consumer Electronics, IEEE Piscataway, NJ, USA, Jan. 8, 2005, pp. 329-330.

(Continued)

*Primary Examiner* — Jayesh A Patel
(74) *Attorney, Agent, or Firm* — Fish & Richardson P.C.

(57) ABSTRACT

A method of and apparatus for image analysis for picture loss detection in fields or frames in video or film content makes use of different correlation characteristics of picture images and non-picture images to detect picture loss. A measure of self correlation of a plurality of image data samples, and a measure of the correlation of the plurality of image data samples with a mean value are determined, and a positive detection of picture loss is based on a comparison between the two correlation measures.

20 Claims, 2 Drawing Sheets

U.S. PATENT DOCUMENTS

| | | | |
|---|---|---|---|
| 2001/0021224 A1* | 9/2001 | Larkin et al. | 375/240.16 |
| 2001/0033702 A1* | 10/2001 | Kawabata | 382/294 |
| 2002/0097920 A1* | 7/2002 | Bender et al. | 382/278 |
| 2002/0105597 A1 | 8/2002 | Janko et al. | 348/700 |
| 2002/0180870 A1 | 12/2002 | Chen | |
| 2003/0026457 A1* | 2/2003 | Nahum | 382/106 |
| 2003/0123714 A1* | 7/2003 | O'Gorman et al. | 382/124 |
| 2004/0062420 A1* | 4/2004 | Rohaly | 382/107 |
| 2004/0190633 A1 | 9/2004 | Ali et al. | 375/240.29 |
| 2005/0031211 A1* | 2/2005 | Meur et al. | 382/232 |
| 2005/0162516 A1 | 7/2005 | Loepfe et al. | 348/156 |
| 2007/0189637 A1* | 8/2007 | Rohaly | 382/278 |

FOREIGN PATENT DOCUMENTS

| | | | |
|---|---|---|---|
| JP | 9293082 | * | 11/1997 |
| JP | 2002-290998 | | 10/2002 |
| JP | 2002300404 | | 10/2002 |
| WO | 02/054364 A2 | | 7/2002 |

OTHER PUBLICATIONS

European Search Report, European Patent Application No. 06 25 4546.2, 4 pages, Apr. 12, 2012.

* cited by examiner

METHOD OF AND APPARATUS FOR IMAGE ANALYSIS

FIELD OF THE INVENTION

The present invention relates to a method of and apparatus for image analysis. In particular the invention may relate to automatic picture loss detection.

RELATED APPLICATIONS

Under 35 USC 119, this application claims the benefit of the priority date of UK application No. 0518441.1, filed on Sep. 9, 2005, the contents of which are incorporated herein by reference.

BACKGROUND OF THE INVENTION

The monitoring or evaluation of film or video content is an area of growing interest, both for broadcasters and for content owner or content management organizations.

In particular, it is desirable for broadcast organizations to be able to monitor the audio-visual content being broadcast to identify, and therefore quickly respond to, problems or errors in the broadcast chain, for example a loss of picture. This may be caused by a number of factors, for example: failure of a radio frequency link; play-out of video information from a store that has not been initialized properly; play out of blank D5 tape; or other fault conditions as will be apparent to a skilled person.

Typically, previously this has been achieved by a person visually monitoring the program output, or more generally monitoring a number of program outputs, and visually identifying errors in the program output. Clearly, this is personnel-intensive and it is desirable to provide automated or semi-automated monitoring and error protection.

One approach to this problem is to estimate the noise floor power level. An image can then be flagged as a "non-picture" image if the noise floor power level exceeds a threshold.

A problem with this approach is that the noise floor power level derived mathematically from an image does not necessarily correlate accurately with the perceived level of noise in the image. Thus this technique may result in inaccurate identification of images as non-picture images. Another disadvantage arises from the necessity to use a frame store to achieve temporal averaging when implementing in hardware, which may be difficult in resource-limited implementations.

SUMMARY OF INVENTION

The present invention seeks to provide an improved method of and apparatus for image analysis for picture loss detection in fields or frames in video or film content.

The invention is particularly applicable to resource-limited implementations.

In accordance with one aspect of the present invention there is provided a method of image analysis of a first set of image data samples, comprising the steps of: determining a first correlation measure depending on the correlation of the first set of image data samples with at least a second set of image data samples, the image data samples of the second set being displaced from respective image data samples of the first set; determining a second correlation measure depending on the correlation of the first set of image data samples with a mean value; and determining a positive result based on a comparison between the first correlation measure and the second correlation measure.

The plurality of image data samples are preferably at least a representative set of image data samples of an image.

The first correlation measure may be determined from a cumulative sum of the magnitudes of differences between the value of each image data sample of the first set of sample values and the image data sample value of the respective displaced image data sample in the second set. Advantageously a second cumulative sum of the magnitudes of differences between the value of each image data sample of the first set of image data sample values and the image data sample value of the respective displaced image data sample in a third set of image data samples is found, where the first correlation measure is determined from the cumulative sum and the second cumulative sum.

The second correlation measure may be determined from a cumulative sum of the magnitudes of differences between image data sample values and an assumed mean image data value. Advantageously the assumed mean image data value is determined to be the mean image data value of a preceding image of a sequence of images. Preferably, the method of image analysis also comprises the steps of: calculating the actual mean image data value of the plurality of image data samples; comparing the actual mean image data value with the assumed mean image data value; and determining the reliability of the image analysis based on the result of the comparison.

Advantageously the displaced image data sample value is separated from the current image data sample value by n image data sample values, where 1<n<32. Preferably, such separation is horizontal, but the separation may additionally or alternatively be a vertical or other spatial separation, or a temporal separation.

Preferably a positive result is notified only when a positive result is determined for m consecutive images in a sequence of images, where m>1. This enables false positive notifications to be reduced, by requiring a positive result to be obtained for a number of images or image pairs before notification is made.

In accordance with a second aspect of the invention, there is provided a program carrier storing processor-implementable instructions for carrying out the method of the invention.

In accordance with a third aspect of the invention there is provided an apparatus for image analysis adapted to carry out the method of the invention.

BRIEF DESCRIPTION OF THE DRAWINGS

For a better understanding of the present invention, and to show how it may be brought into effect, reference will now be made, by way of example, to the accompanying drawings, in which.

DETAILED DESCRIPTION OF THE INVENTION

The present invention is based on the realization by the inventors that adjacent or nearby pixels in a picture image will normally have a correlation characteristic that is different from the correlation characteristic of adjacent or nearby pixels in a non-picture image. Specifically, it is expected that a non-picture image will be stationary, in a statistical sense, and a picture image will be non-stationary. In statistics, a process is considered to be statistically stationary if its probability density function does not vary over time. In the present context of analysis of images, an image is considered to be statistically stationary if the probability density function does not vary over the image area. A sequence of images may be considered to be statistically stationary if individual images of the sequence are statistically stationary and/or if the probability density function does not vary between adjacent images. Therefore it is to be expected that non-picture images may be distinguished from picture images in dependence on measurement of the degree to which the image is stationary.

One known method of measuring correlation is the Pearson correlation coefficient. The Pearson correlation coefficient r is defined as the covariance of a set of data points (x,y) divided by the square root of the product of the individual variances;

$$r = \frac{\text{Cov}[x, y]}{\sqrt{\text{Var}[x] \times \text{Var}[y]}} \qquad (1)$$

The Pearson correlation coefficient may be applied to image data to determine the degree to which an image is statistically stationary. To apply the Pearson correlation coefficient to image data, the data points (x,y) of the Pearson correlation coefficient may be chosen to be (current luminance sample $Y_x$, luminance sample k pixels ago $Y_{x-k}$).

Thus the Pearson correlation coefficient between the current luminance value ($Y_x$) and the luminance sample k pixels ago ($Y_{x-k}$) can be written as $$r[Y_x, Y_{x-k}] = \frac{\text{Cov}[Y_x, Y_{x-k}]}{\sqrt{\text{Var}[Y_x] \times \text{Var}[Y_{x-k}]}} \qquad (2)$$

Figure 1:
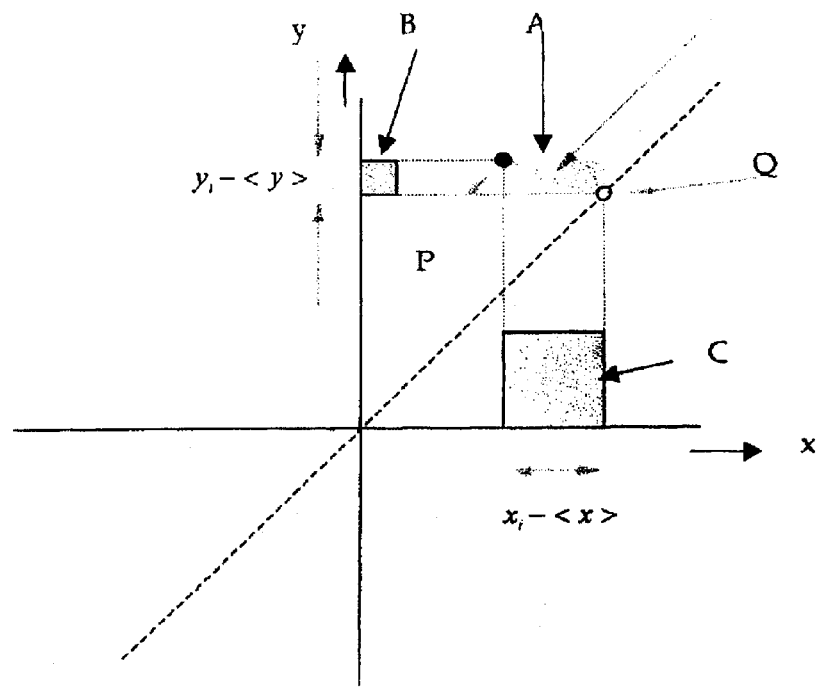
FIG. 1 is a graphical representation of the contribution of a single image data point P to a Pearson correlation coefficient calculation.

FIG. 1 is a graphical representation of the contribution of a single image data point P to a Pearson correlation coefficient calculation. The x-axis in FIG. 1 represents the luminance value of the current pixel, and the y-axis represents the luminance value of the pixel k pixels ago (an offset pixel). The mean of the distribution of all sample points within a sample of pixels representative of the image is represented by point Q; and point P is an exemplary data point.

The area A represents the product of the difference between the current pixel value and the mean current pixel value, and the difference between the current offset pixel value and the mean offset pixel value. The area B represents the square of the difference between the current offset pixel value and the mean offset pixel value, and area C represents the square of the difference between the current pixel value and the mean current pixel value.

As will be apparent to a skilled person, for any particular points the area A may be positive or negative, since for any particular point the difference between an individual value and the mean value may be positive or negative on both axes. For the point P shown in FIG. 1, the area A is negative. In contrast, areas B and C are always positive, since they represent squares of differences between an individual value and the mean value.

It can be shown that the Pearson correlation coefficient is equivalent to the sum of areas A (over all data points) divided by the square root of the product of the sum of areas B (over all data points) and the sum of areas C (over all data points). In other words, the sum of area A over all sample points measures, effectively, the co-variance numerator term of equation 2 while the square root of the product of the sum of area B and the sum of area C over all sample points represents the variance denominator term of equation 1.

The contribution of a single data point to the Pearson correlation coefficient is a maximum when the data point lies on the line y=x. In this situation, the areas A, B and C will be equal and the contribution of such a data point to the Pearson correlation coefficient will be a maximum. When the data point does not lie on the line y=x, the area A will be less than the square root of the product of areas B and C, and the contribution of such a data point to the Pearson correlation coefficient will be less than the maximum, as will be apparent to a skilled person from a consideration of FIG. 1.

Thus if all the data points lie on the line y=x, the Pearson correlation coefficient will be 1 (showing good correlation). Thus, a good way of understanding the Pearson correlation coefficient graphically is that the Pearson correlation coefficient measures approximately how well the points fit the line y=x.

As discussed above, evaluating whether an image is well-correlated can be considered to be equivalent to evaluating how well the data points (current luminance sample, luminance sample k pixels ago) fit on a line y=x, where the x-axis represents the luminance value of the current pixel, and the y-axis represents the luminance value of the pixel k pixels ago.

This is to be expected, as generally picture images are well correlated because the luminance value of a particular pixel in a picture image is likely to be similar to the luminance value of spatially or temporally close pixels. In contrast, non-picture images are likely to be less well correlated, because the luminance value of a particular pixel in a non-picture image is unrelated to the luminance value of spatially or temporally close pixels.

Figure 2:
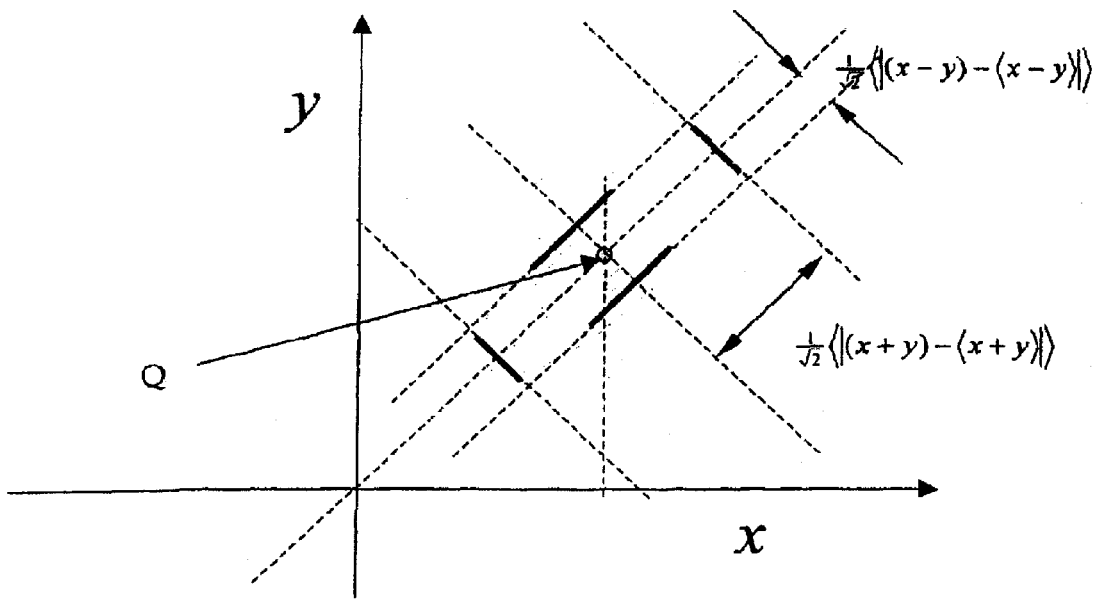
FIG. 2 illustrates a method of estimating how well the data points align along the y=x line.

FIG. 2 illustrates a method of estimating how well the data points (current luminance sample, luminance sample k pixels ago) align along the y=x line, and therefore how well correlated are the data points. Again in FIG. 2 the x-axis represents the luminance value of the current pixel and the y-axis represents the luminance value of the pixel k pixels ago (the offset pixel).

The mean of the distribution of all sample points within a sample of pixels representative of the image is represented by point Q. Thus, with reference to FIG. 2, the spread of pixel values along the y=x line and the spread of pixel values perpendicular to the y=x axis can be determined. The term $$\frac{1}{\sqrt{2}} \langle |(x-y) - \langle x-y \rangle| \rangle$$

is a measure representing the spread of data points in a direction perpendicular to the y=x line, where the brackets $\langle a \rangle$ denote the mean value of a variable a. The term $$\frac{1}{\sqrt{2}} \langle |(x+y) - \langle x+y \rangle| \rangle$$

is a measure representing the spread of data points in a direction parallel to the y=x line. The ratio of these terms enables the deviation from y=x relative to the variation in the pixel values per se to be determined, thus providing a measure of how spread out is the data.

The ratio between the spread of pixel values along the y=x line and the spread of pixel values perpendicular to the y=x line may be represented by expression (3)

$$\frac{\langle |(x-y) - \langle x-y \rangle| \rangle}{\langle |(x+y) - \langle (x+y) \rangle| \rangle}. \quad (3)$$

As indicated above, it is expected that picture images will be well correlated and the data points will be spread along the y=x line. In this case the numerator will be smaller than the denominator and the expression is less than one. In contrast, it is expected that non-picture images will not be well correlated, and the data points will be distributed more randomly about the mean data point. In this case, the expression will be close to 1.

Since data elements x and y are simply displaced versions of each other, we can assume that data elements x and y have the same mean and that the mean difference value is zero. In view of these assumptions, expression 3 approximates (apart from a scaling factor) to:

$$\frac{\langle |x-y| \rangle}{\langle |x - \langle x \rangle| \rangle} \quad (4)$$

Expression 4 per se is difficult to apply in real time applications, since it requires the average absolute deviation of the pixel luminance values from the mean pixel luminance value $\langle |x-\langle x \rangle| \rangle$ to be determined before the mean pixel luminance value $\langle x \rangle$ is known. By definition the value of the mean pixel luminance value $\langle x \rangle$ of a representative set of pixels can only be definitively determined at the end of the representative set.

In order to obtain a practical calculable coefficient, the mean luminance value in the sample $\langle x \rangle$ can be approximated. One approximation is to assume that the mean luminance value $\langle x \rangle$=128 (mid gray) for 8-bit luminance values. Clearly for many images this will be a reasonable assumption and will give good results. However, if the image is predominantly dark or predominantly light, the actual mean luminance value may differ significantly from mid-gray. In fact, it appears that the approximation $\langle x \rangle$=128 (mid gray) is a valid approximation for images where the actual mean 8-bit luminance value is approximately $118 \leq \langle x \rangle \leq 138$.

If further refinement were required, it would be possible to use a number of different assumed values of mean luminance value $\langle x \rangle$ in parallel detectors.

Alternatively, in some embodiments, mean luminance value $\langle x \rangle$ may be approximated as the pixel luminance data is received, for example by using a simple running average, centile estimation or IIR (Infinite Impulse response filter) estimate.

An alternative method of approximating the mean luminance value $\langle x \rangle$ is to use a calculated mean luminance value for the preceding image in a sequence of images as the approximated mean luminance value. This is likely to provide a reasonably accurate estimate of the mean luminance value for a current image in a sequence, since generally it is expected that the mean luminance value of an image will be similar to that of adjacent images.

In addition, at the end of a frame, a comparison can be made between the assumed mean value for the frame (i.e. the mean luminance value calculated for the previous frame) and the actual mean value for the frame. If the assumed mean value and the actual mean value differ significantly, it might be concluded that the presence or absence of a non-picture image cannot be reliably detected, and no picture detection output can be output for that frame (or the picture detection output can be flagged as unreliable).

Calculating the coefficient set out in expression 4 with an offset of 3 pixels and comparing it with an empirically derived threshold of 1.1 was found to be effective in discriminating non-picture images from picture images. This leads to expression (5):

$$\sum_{i=1}^{i=N} |Y_i - Y_{i-3}| < 1.1 \sum_{i=1}^{i=N} |Y_i - 128|$$

where: $Y_{i-3}$ is the sample value of the sample 3 samples ago;

$Y_i$ is the sample value of the current sample; and there are N samples in the representative set.

Clearly, the threshold 1.1 can be varied as necessary by a skilled person in order to discriminate between picture images and non-picture images.

Figure 3:
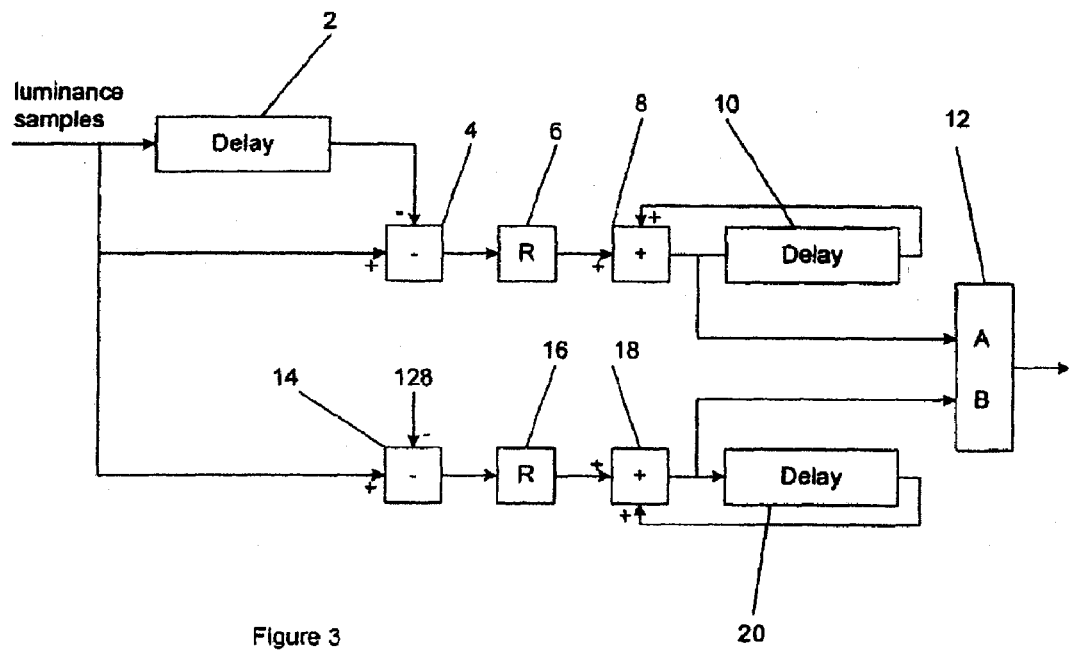
FIG. 3 illustrates an exemplary embodiment.

An exemplary embodiment of the invention is shown in FIG. 3.

Firstly, 8-bit luminance samples representative of an image are successively input. Luminance samples are subject to an offset delay, in this example a 3 pixel delay, in delay 2 to form offset pixel values and are subtracted from current luminance samples in subtractor 4. The difference value is rectified in rectifier 6 and the rectified difference values are accumulated over the representative set of luminance sample values by adder 8 and sample delay 10. At the end of the representative set of luminance sample values, the accumulated rectified difference value is output to a comparator 12 as comparator 12 input A. As will be apparent to a skilled person, the accumulated rectified difference value corresponds to the left hand side of expression 5.

In parallel, an estimated mean value of 128 is subtracted from the luminance values in subtractor 14. The resulting difference value is rectified in rectifier 16 and the rectified difference values are accumulated over the representative set of luminance sample values by an adder 18 and sample delay 20. At the end of the representative set of luminance sample values, the accumulated rectified difference value is output to input B of the comparator 12. As will be apparent to a skilled person, the accumulated rectified difference value corresponds to the right hand side of expression 5.

The comparator 12 receives the accumulated rectified difference values at inputs A and B, and outputs an identification of a non-picture image when A<1.1 B, in accordance with expression 5.

Figure 4:
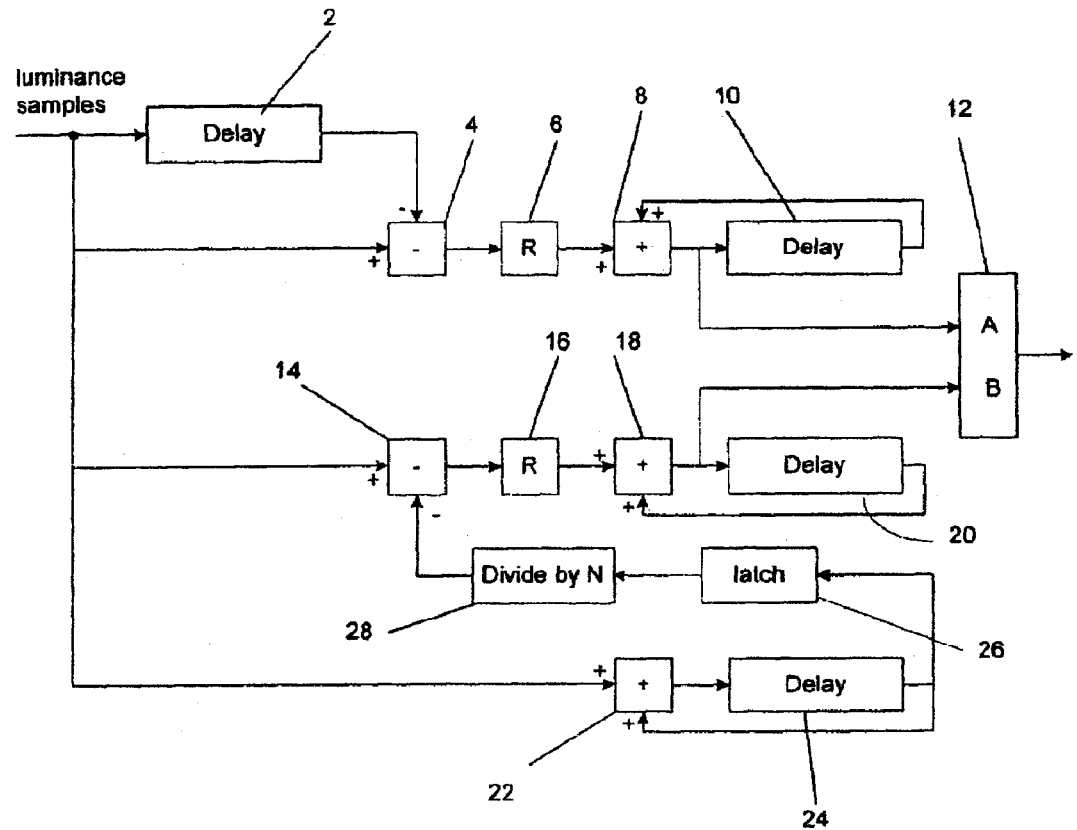
FIG. 4 illustrates an alternate exemplary embodiment.

FIG. 4 illustrates an alternate exemplary embodiment in which the mean luminance sample value for an image is used as the estimate of the mean luminance sample value for the next image in a sequence of images. The arrangement shown in FIG. 4 is similar to that shown in FIG. 3 and the same reference numerals have been used for the same or similar elements.

The function of elements 2-20 shown in FIG. 4 are the same as the function of elements 2-20 in FIG. 3, and the description thereof will not be repeated. However, instead of an estimated mean of 128 being subtracted from the input luminance values by subtractor 14 as described above with reference to FIG. 3, in FIG. 4 the mean luminance sample value calculated from the representative set of luminance sample values for an image is used as the estimate of the mean luminance sample value for the next image in a sequence of images.

Thus, the luminance sample values are accumulated over the representative set of luminance sample values for an image by means of an adder 22 and a sample delay 24. At the end of the representative set, the accumulated value is latched in latch 26 and divided by N (the number of samples in the representative set) in divider 28, to establish the mean luminance sample value for the image. This value can then be used, as the second input to subtractor 14 as an estimate of the mean sample value for the next image in a sequence of images.

Preferably the number of sample values N in the representative set is chosen to be a multiple of 2, so that the divider 26 can simply truncate an accumulated binary value by an appropriate number of bits to achieve division by the number of sample values N.

An alternative approximation of expression (3) assuming that data elements x and y have the same mean, is:

$$\frac{\langle |x-y| \rangle}{\langle |(x+y) - 2\langle x \rangle| \rangle} \quad (6)$$

Expression 6 can be easily implemented in similar arrangements to the arrangements shown in FIGS. 3 and 4. Thus, for example, a delay (to generate an offset pixel value) and an accumulator could be inserted between the input luminance samples and subtractor 14 in the arrangements shown in FIGS. 3 and 4 in order to form the left hand term of the denominator of expression 6. The mean value 128 in FIG. 3 or the mean value output from divider 26 in FIG. 4 should then be doubled prior to being subtracted from the left hand term of the denominator of expression 6 in subtractor 14. The comparator 12 will then receive the accumulated rectified difference values corresponding to the numerator and the denominator of expression 6 at inputs A and B, and outputs an identification of a non-picture image when A<c.B, where c is an empirically derived constant.

Preferably, when evaluating a sequence of images, a record of such non-picture image identifications is kept and a positive identification of non-picture images is not made until a number, for example three, of successive images have been identified as non-picture images.

The exemplary embodiments of the invention have been described with reference to the use of luminance image data. However the invention may be employed using chrominance image data in addition to or as an alternative to, luminance data.

In addition, 8-bit sample values have been assumed, which leads to an estimate of the mean sample value as 128 in the embodiment shown in FIG. 3. However, clearly other sample value sizes can be used: in this case a mean sample value may be selected to be substantially half the maximum possible sample value, or as the mean of maximum and minimum possible sample sizes, or to be some other number judged to be a likely mean value.

In the illustrative embodiment, a pixel offset of 3 pixels has been used to discriminate between picture and non-picture images. However, it is possible to use other pixel offset values. In particular, in some situations, reliable discrimination may be obtained using adjacent pixels (i.e. with an offset value of 1). In other situations, it may be advantageous to use offset pixels in different compression scheme (e.g. MPEG) macro-blocks, thus for example with an offset of up to 16 or 32 pixels.

Preferably the pixel values are offset horizontally from each other, as is the case in the exemplary embodiments described above, since generally this arrangement is easier to implement. However, the inventive concepts may also be applied to vertically offset pixel comparisons. In addition, although it is envisaged that the offset pixel will generally be spatially offset within a single image, it will be apparent that the inventive concepts may also be applied to analysis using pixels from adjacent images in a sequence of images. Thus in some embodiments it may be possible to use information from nearby fields or frames of a sequence of images as temporally offset pixels in the method of the invention.

The representative set may include all pixels in an image. However, it may be preferable to omit samples at the edge of an image from the representative set, for example to ensure that all offset samples are horizontally offset from the current sample.

In addition, it would be possible to sub-sample the data so that sample values were input only at the offset value frequency, and not for each pixel. So, for example, in the illustrated embodiment, successive pixel values are used and the offset pixel values are generated by means of the offset delay in delay 2. However, the input luminance values may have already been subsampled to be at the offset interval, in this case 3 pixels, in which case delay 2 would be a single sample delay.

In an alternate embodiment (not shown) comparisons with two different offset samples are made. Thus, for example, in addition to calculating the cumulative difference between the current sample value and the sample value three pixels ago, the cumulative difference between the current sample value and the sample value one pixel ago may also be calculated. The cumulative difference between the current sample value and the sample value one pixel ago may then be subtracted from the cumulative difference between the current sample value and the sample value three pixel ago, and the resulting difference value compared with the difference between the sample values and the mean value using a suitable scaling factor. This is shown in expression 7.

$$\sum_{i=1}^{i=N} |Y_i - Y_{i-3}| - \sum_{i=1}^{i=N} |Y_i - Y_{i-1}| < c \cdot \sum_{i=1}^{i=N} |Y_i - 128| \quad (7)$$

The use of comparisons with more than one offset pixel may enable a more reliable discrimination of non-picture images to be made. In particular, the use of more than one offset pixel enables more accurate discrimination of picture images with fine detail or vertical stripes.

As will be apparent to a skilled person, the invention may be embodied in hardware or in software running on a suitable processor. In addition, as will be apparent to a skilled person the present invention is equally applicable to analysis of streaming data or to analysis of data files.

The present invention thus provides an advantageous method and apparatus for automatic picture loss detection.

Clearly many different arrangements can be envisaged embodying the inventive concepts described herein, and the invention is not intended to be restricted to the arrangements disclosed above.

The invention claimed is:

1. A method of image analysis, the method comprising:
receiving a video comprising images;
processing one of the images in the video to determine whether the image is a picture image representing a picture or a non-picture image resulting from a fault condition, the non-picture image being statistically stationary, the image being represented by a set of image data samples, the processing comprising determining a first correlation measure depending on the correlation of a first subset of image data samples from the set of image data samples with at least a second subset of image data samples from the set of image data samples, the image data samples of the second subset being offset spatially from respective image data samples of the first subset;

determining a second correlation measure depending on the correlation of the first subset of image data samples with a mean image data sample value; and determining a positive result that the image is a non-picture image that is statistically stationary based on a comparison between the first correlation measure and the second correlation measure.

2. The method of claim 1, wherein the positive result is determined when the first correlation measure and the second correlation measure are substantially equal.

3. The method of claim 2, wherein the positive result is determined when the magnitude of the ratio between the first correlation measure and the second correlation measure is less than 1.25.

4. The method of claim 1, wherein determining the first correlation measure comprises: determining a cumulative sum of the magnitudes of differences between the value of each image data sample of the first subset of sample values and the image data sample value of the respective displaced image data sample in the second subset.

5. The method of claim 1, wherein determining the first correlation measure also depends on the correlation of the first subset of image data samples with a third subset of image data samples, the image data samples of the third subset being displaced from respective image data samples of the first subset by a different displacement value.

6. The method of claim 5, wherein determining the first correlation measure also comprises determining a second cumulative sum of the magnitudes of differences between the value of each image data sample of the first subset of sample values and the image data sample value of the respective displaced image data sample in the third subset, wherein the first correlation measure is determined from the cumulative sum and the second cumulative sum.

7. The method of claim 1, wherein determining the second correlation measure comprises determining a cumulative sum of the magnitudes of differences between image data sample values of the first subset of image data sample values and an approximated mean image data value.

8. The method of claim 7, wherein the approximated mean image data value is substantially equal to a mid-point between maximum and minimum permissible data values.

9. The method of claim 7, wherein the approximated mean image data value is determined by calculating a mean image data value of a preceding image of a sequence of images.

10. The method of claim 9, further comprising:
calculating a mean image data value of the first subset of image data samples;
comparing said mean image data value with said approximated mean image data value; and
determining the reliability of the image analysis based on the result of the comparison.

11. The method of claim 4, wherein said image data sample of the second subset of image data samples is separated from the respective image data sample of the first subset of image data samples by a spatial or temporal distance of n image data sample values, where 1<n<32.

12. The method of claim 1, further comprising drawing attention to a positive result only when a positive result is determined for m consecutive images in a sequence of images, where m>1.

13. A tangible non-transitory program carrier storing processor-implementable instructions for carrying out the method of claim 4.

14. A tangible non-transitory computer-readable medium having encoded thereon software for image analysis, the software comprising instructions for
receiving a video comprising images;
processing one of the images in the video to determine whether the image is a picture image representing a picture or a non-picture image resulting from a fault condition, the non-picture image being statistically stationary, the image being represented by a set of image data samples, the processing comprising
determining a first correlation measure depending on the correlation of the first subset of image data samples from the set of image data samples with at least a second subset of image data samples from the set of image data samples, the image data samples of the second subset being offset spatially from respective image data samples of the first subset;
determining a second correlation measure depending on the correlation of the first subset of image data samples with a mean image data sample value; and
determining a positive result that the image is a non-picture image that is statistically stationary based on a comparison between the first correlation measure and the second correlation measure.

15. The method of claim 1, comprising detecting picture loss in the video based on determining a positive result that the image is a non-picture image in the video.

16. The computer-readable medium of claim 14 in which the software comprises instructions for detecting picture loss in the video based on determining a positive result that the image is a non-picture image in the video.

17. The method of claim 1 in which the non-picture image is determined to be statistically stationary if a probability density function does not vary over an area of the image.

18. A method of image analysis, the method comprising:
receiving a video comprising images;
processing a first one of the images in the video to determine whether the image is a picture image representing a picture or a non-picture image resulting from a fault condition, the non-picture image being statistically stationary, the processing comprising
determining a first correlation measure depending on the correlation of a first set of image data samples with at least a second set of image data samples, the image data samples of the second set being offset spatially from respective image data samples of the first set, the first set of image data samples being selected from image data samples representing the first one of the images in the video, the second set of image data samples being selected from image data samples representing a second one of the images in the video;
determining a second correlation measure depending on the correlation of the first set of image data samples with a mean image data sample value; and
determining a positive result that the first one of the images is a non-picture image that is statistically stationary based on a comparison between the first correlation measure and the second correlation measure.

19. The method of claim 18 in which the non-picture image is determined to be statistically stationary if a probability density function does not vary over an area of the image.

20. The method of claim 18 in which a sequence of images in the video are evaluated, a record of non-picture identifications is stored, and a positive identification of non-picture images is not made until a predefined number of successive images have been identified as non-picture images.

* * * * *